(12) United States Patent
Reding et al.

(10) Patent No.: US 8,488,766 B2
(45) Date of Patent: Jul. 16, 2013

(54) METHODS AND SYSTEMS FOR MULTIUSER SELECTIVE NOTIFICATION

(75) Inventors: Craig L. Reding, Midland Park, NJ (US); Mahesh Rajagopalan, Irving, TX (US); Christopher Helbling, Stamford, CT (US)

(73) Assignees: Verizon Data Services LLC, Temple Terrace, FL (US); Telesector Resources Group, Inc., New York, NY (US)

( * ) Notice: Subject to any disclaimer, the term of this patent is extended or adjusted under 35 U.S.C. 154(b) by 1573 days.

(21) Appl. No.: 10/720,944

(22) Filed: Nov. 24, 2003

(65) Prior Publication Data

US 2004/0156491 A1 Aug. 12, 2004

Related U.S. Application Data

(63) Continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, (Continued)

(51) Int. Cl.
*H04M 3/42* (2006.01)
*H04M 1/00* (2006.01)
*G06F 15/167* (2006.01)

(52) U.S. Cl.
USPC ............ 379/211.02; 379/201.01; 379/201.02; 379/201.07; 455/414.1; 455/556.1; 709/212; 709/213; 709/214; 709/216

(58) Field of Classification Search
USPC .................. 379/211.02, 88.04, 88.12, 211.01, 379/218.01, 201.07, 201.01, 201.08, 201.02; 455/458, 466, 557, 414.1, 420, 556.1, 414.2; 707/102, 200, 202, 204; 709/212, 213, 214, 709/216
See application file for complete search history.

(56) References Cited

U.S. PATENT DOCUMENTS 4,013,839 A 3/1977 Bell
(Continued)

FOREIGN PATENT DOCUMENTS

CA 2240878 12/1998
(Continued)

OTHER PUBLICATIONS

"The Mobile Phone User Guide", http://www.mobileshop.org/usertech/wildfire.htm, printed Oct. 1, 2004.

(Continued)

Primary Examiner — Thjuan K Addy

(57) ABSTRACT

Methods and systems are provided for managing a communications line associated with two or more users. These methods and systems include receiving first user line management information regarding handling of calls to the communications line from one or more contacts in a first address book, the first address book associated with the first user. Further, these methods and systems include receiving second user line management information regarding handling of calls to the communications line from one or more contacts in a second address book, the second address book associated with the second user. Additionally, the methods and systems are capable of receiving from the communications network information regarding a call received on the communications line associated with the two or more users, determining handling of the call based on the received first user and second user line management information, and forwarding to the communications network instructions regarding the handling of the call, such that the communications network handles the call in accordance with the determined handling.

35 Claims, 8 Drawing Sheets

Related U.S. Application Data now Pat. No. 7,190,773, and a continuation-in-part of application No. 10/083,822, filed on Feb. 27, 2002.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002.

(56) References Cited

U.S. PATENT DOCUMENTS

| | | | | |
|---|---|---|---|---|
| 4,540,850 | A | 9/1985 | Herr et al. | 379/88.19 |
| 4,600,814 | A | 7/1986 | Cunniff et al. | |
| 4,924,496 | A | 5/1990 | Figa et al. | |
| 5,014,303 | A | 5/1991 | Velius | |
| 5,168,515 | A | 12/1992 | Gechter et al. | |
| 5,222,125 | A | 6/1993 | Creswell et al. | |
| 5,274,700 | A | 12/1993 | Gechter et al. | |
| 5,327,486 | A | 7/1994 | Wolff et al. | 379/93.23 |
| 5,329,578 | A | 7/1994 | Brennen et al. | |
| 5,428,663 | A | 6/1995 | Grimes et al. | |
| 5,440,624 | A | 8/1995 | Schoof | |
| 5,483,586 | A * | 1/1996 | Sussman | 379/218.01 |
| 5,533,096 | A | 7/1996 | Bales | |
| 5,535,265 | A | 7/1996 | Suwandhaputra | |
| 5,548,636 | A | 8/1996 | Bannister et al. | |
| 5,550,907 | A | 8/1996 | Carlsen | |
| 5,583,564 | A | 12/1996 | Rao et al. | |
| 5,586,173 | A | 12/1996 | Misholi et al. | |
| 5,588,037 | A | 12/1996 | Fuller et al. | |
| 5,608,788 | A | 3/1997 | Demlow et al. | |
| 5,619,555 | A | 4/1997 | Fenton et al. | |
| 5,621,787 | A | 4/1997 | McKoy et al. | |
| 5,623,541 | A | 4/1997 | Boyle et al. | |
| 5,631,904 | A | 5/1997 | Fitser et al. | 370/261 |
| 5,638,434 | A | 6/1997 | Gottlieb et al. | |
| 5,649,105 | A | 7/1997 | Aldred et al. | |
| 5,652,789 | A | 7/1997 | Miner et al. | 379/201 |
| 5,661,788 | A | 8/1997 | Chin | |
| 5,668,863 | A | 9/1997 | Bieselin et al. | |
| 5,673,080 | A | 9/1997 | Biggs et al. | |
| 5,692,213 | A | 11/1997 | Goldberg et al. | |
| 5,710,591 | A | 1/1998 | Bruno et al. | |
| 5,712,903 | A | 1/1998 | Bartholomew et al. | |
| 5,715,444 | A | 2/1998 | Danish et al. | |
| 5,717,863 | A | 2/1998 | Adamson et al. | |
| 5,719,925 | A | 2/1998 | Peoples | |
| 5,724,412 | A | 3/1998 | Srinivasan | |
| 5,742,095 | A | 4/1998 | Bryant et al. | |
| 5,742,668 | A | 4/1998 | Pepe et al. | |
| 5,742,905 | A | 4/1998 | Pepe et al. | |
| 5,745,561 | A | 4/1998 | Baker et al. | |
| 5,745,884 | A | 4/1998 | Carnegie et al. | |
| 5,751,800 | A | 5/1998 | Ardon | |
| 5,752,191 | A | 5/1998 | Fuller et al. | |
| 5,764,901 | A | 6/1998 | Skarbo et al. | |
| 5,805,670 | A | 9/1998 | Pons et al. | |
| 5,841,837 | A | 11/1998 | Fuller et al. | |
| 5,864,603 | A | 1/1999 | Haavisto et al. | |
| 5,872,841 | A | 2/1999 | King et al. | |
| 5,875,242 | A | 2/1999 | Glaser et al. | 379/207 |
| 5,875,437 | A | 2/1999 | Atkins | |
| 5,903,845 | A | 5/1999 | Buhrmann et al. | 455/461 |
| 5,907,324 | A | 5/1999 | Larson et al. | |
| 5,907,547 | A | 5/1999 | Foladare et al. | 370/352 |
| 5,917,817 | A | 6/1999 | Dunn et al. | |
| 5,917,912 | A | 6/1999 | Ginter et al. | |
| 5,920,826 | A | 7/1999 | Metso et al. | |
| 5,920,847 | A | 7/1999 | Kolling et al. | |
| 5,926,535 | A | 7/1999 | Reynolds | |
| 5,944,769 | A | 8/1999 | Musk et al. | |
| 5,945,989 | A | 8/1999 | Freishtat et al. | |
| 5,960,342 | A | 9/1999 | Liem et al. | |
| 5,963,925 | A | 10/1999 | Kolling et al. | |
| 5,982,870 | A | 11/1999 | Pershan et al. | |
| 6,005,870 | A | 12/1999 | Leung et al. | |
| 6,018,571 | A | 1/2000 | Langlois et al. | |
| 6,018,737 | A | 1/2000 | Shah et al. | |
| 6,021,428 | A | 2/2000 | Miloslavsky | |
| 6,029,151 | A | 2/2000 | Nikander | |
| 6,031,896 | A | 2/2000 | Gardell et al. | |
| 6,041,103 | A | 3/2000 | La Porta et al. | |
| 6,052,372 | A | 4/2000 | Gittins et al. | |
| 6,058,163 | A | 5/2000 | Pattison et al. | |
| 6,061,432 | A | 5/2000 | Wallace et al. | |
| 6,078,658 | A | 6/2000 | Yunoki | |
| 6,100,882 | A | 8/2000 | Sharman et al. | |
| 6,122,348 | A | 9/2000 | French-St Geroge et al. | |
| 6,134,318 | A | 10/2000 | O'Neil | |
| 6,134,548 | A | 10/2000 | Gottsman et al. | |
| 6,144,671 | A | 11/2000 | Perinpanathan et al. | |
| 6,154,646 | A | 11/2000 | Tran et al. | |
| 6,161,008 | A | 12/2000 | Lee et al. | |
| 6,163,692 | A | 12/2000 | Chakrabarti et al. | |
| 6,167,119 | A * | 12/2000 | Bartholomew et al. | 379/88.04 |
| 6,188,756 | B1 | 2/2001 | Mashinsky | |
| 6,189,026 | B1 | 2/2001 | Birrell et al. | |
| 6,192,123 | B1 | 2/2001 | Grunsted et al. | 379/350 |
| 6,195,660 | B1 | 2/2001 | Polnerow et al. | |
| 6,654,768 | B2 | 2/2001 | Celik | |
| 6,215,863 | B1 | 4/2001 | Bennett et al. | |
| 6,219,413 | B1 | 4/2001 | Burg | 379/215.01 |
| 6,226,374 | B1 | 5/2001 | Howell et al. | 379/207 |
| 6,240,449 | B1 | 5/2001 | Nadeau | |
| 6,260,050 | B1 | 7/2001 | Yost et al. | |
| 6,275,575 | B1 | 8/2001 | Wu | |
| 6,282,522 | B1 | 8/2001 | Davis et al. | |
| 6,296,062 | B1 | 10/2001 | Gardell et al. | |
| 6,298,129 | B1 | 10/2001 | Culver et al. | |
| 6,301,338 | B1 | 10/2001 | Makela et al. | |
| 6,301,609 | B1 | 10/2001 | Aravamudan et al. | 709/207 |
| 6,310,939 | B1 | 10/2001 | Varney | |
| 6,310,947 | B1 | 10/2001 | Polcyn | 379/211.01 |
| 6,324,269 | B1 | 11/2001 | Malik | |
| 6,333,973 | B1 | 12/2001 | Smith et al. | |
| 6,349,299 | B1 | 2/2002 | Spencer et al. | |
| 6,351,279 | B1 | 2/2002 | Sawyer | |
| 6,363,143 | B1 | 3/2002 | Fox | |
| 6,371,484 | B1 | 4/2002 | Yuan | |
| 6,373,817 | B1 | 4/2002 | Kung et al. | |
| 6,373,930 | B1 | 4/2002 | McConnell et al. | |
| 6,385,754 | B1 | 5/2002 | Mizumoto et al. | |
| 6,389,113 | B1 | 5/2002 | Silverman | |
| 6,404,873 | B1 | 6/2002 | Beyda et al. | |
| 6,408,191 | B1 | 6/2002 | Blanchard et al. | |
| 6,408,327 | B1 | 6/2002 | McClennon et al. | |
| 6,411,605 | B1 | 6/2002 | Vance et al. | |
| 6,418,214 | B1 | 7/2002 | Smythe et al. | |
| 6,430,176 | B1 | 8/2002 | Christie | |
| 6,430,289 | B1 | 8/2002 | Liffick | 379/900 |
| 6,434,226 | B1 | 8/2002 | Takahashi | |
| 6,442,245 | B1 | 8/2002 | Castagna et al. | |
| 6,442,251 | B1 | 8/2002 | Maes et al. | |
| 6,442,748 | B1 | 8/2002 | Bowman-Amuah | |
| 6,453,031 | B2 | 9/2002 | Malik | |
| 6,453,167 | B1 | 9/2002 | Michaels et al. | |
| 6,459,780 | B1 | 10/2002 | Wurster et al. | 379/142.02 |
| 6,459,913 | B2 | 10/2002 | Cloutier | |
| 6,463,145 | B1 | 10/2002 | O'Neal et al. | 379/211.02 |
| 6,463,464 | B1 | 10/2002 | Lazaridis et al. | |
| 6,466,910 | B1 | 10/2002 | Desmond et al. | |
| 6,470,079 | B1 | 10/2002 | Benson | |
| 6,473,615 | B1 | 10/2002 | Theppasandra et al. | |
| 6,477,374 | B1 | 11/2002 | Shaffer et al. | 455/445 |
| 6,480,830 | B1 | 11/2002 | Ford et al. | |
| 6,480,890 | B1 | 11/2002 | Lee, Jr. et al. | |

| Patent Number | Date | Inventor(s) |
|---|---|---|
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. ............... 370/353 |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. ......... 709/227 |
| 6,574,324 B1 | 6/2003 | Malik |
| 6,574,470 B1 | 6/2003 | Chow et al. |
| 6,577,622 B1 | 6/2003 | Schuster et al. ............. 370/352 |
| 6,577,720 B1 | 6/2003 | Sutter |
| 6,584,122 B1 | 6/2003 | Matthews et al. ............. 370/493 |
| 6,590,603 B2 | 7/2003 | Sheldon et al. |
| 6,590,969 B1 | 7/2003 | Peters et al. |
| 6,593,352 B2 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers ............................ 370/353 |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,643,356 B1 | 11/2003 | Hickey et al. |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,724,887 B1 | 4/2004 | Eibacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 * | 6/2004 | Gross et al. ............... 379/88.12 |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Czuickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B2 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,099,288 B1 | 8/2006 | Parker et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 7,546,337 B1 | 6/2009 | Crawford |
| 7,616,747 B2 | 11/2009 | Wurster et al. |
| 7,912,193 B2 | 3/2011 | Chingon et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |

| Pub. No. | Date | Inventor |
|---|---|---|
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper .................. 379/201.01 |
| 2002/0082028 A1* | 6/2002 | Wittenkamp ................ 455/458 |
| 2002/0082030 A1 | 6/2002 | Berndt et al. |
| 2002/0083462 A1 | 6/2002 | Arnott ........................ 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra .......................... 370/389 |
| 2002/0115471 A1 | 8/2002 | DeLoye et al. |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz .................. 370/352 |
| 2003/0063732 A1 | 4/2003 | Mcknight et al. |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. ............. 709/204 |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1* | 10/2004 | Gross et al. ............... 379/211.01 |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0168140 A1 | 7/2006 | Inoue et al. |
| 2006/0276179 A1 | 12/2006 | Ghaffari et al. |
| 2006/0277213 A1* | 12/2006 | Robertson et al. ............ 707/102 |
| 2007/0021111 A1 | 1/2007 | Celik |
| 2009/0060155 A1 | 3/2009 | Chingon et al. |

FOREIGN PATENT DOCUMENTS

| | | |
|---|---|---|
| DE | 10110942 | 9/2002 |
| EP | 0818908 | 1/1998 |
| EP | 0818908 A3 | 1/1998 |
| EP | 1014630 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 7/1996 |
| JP | 08-181763 | 7/1996 |
| JP | 08-298546 | 11/1996 |
| JP | 8-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000224301 | 8/2000 |
| JP | 2000-270307 | 9/2000 |
| JP | 2000-349902 | 12/2000 |

| | | |
|---|---|---|
| JP | 2001-144859 | 5/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-95/12948 | 5/1995 |
| WO | WO-97/20423 | 6/1997 |
| WO | WO-97/33421 | 9/1997 |
| WO | WO-98/02007 | 1/1998 |
| WO | 99/38309 | 7/1999 |
| WO | 00/45557 | 8/2000 |
| WO | 0064133 | 10/2000 |
| WO | WO-00/60837 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | 0152513 | 7/2001 |
| WO | WO 01/89212 | 11/2001 |
| WO | WO-02/25907 | 3/2002 |
| WO | WO-02/43338 | 5/2002 |

OTHER PUBLICATIONS

Kornowski, J., "Wildfire at Your Back and Call-A Voice-Activated Telephone Assistant That Minds You and Your Messages", http://www.lacba.org/lalawyer/techwildfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"MP3 Recorder Download—MP3 Recorder—Record Audio Stream to MP3 or WAV," 2002, http://www.mp3-recorder.net, Submitted on Nov. 24, 2003.

"FAQ Premium Home Answer" eVoice, http://content.evoice.com/wcs/signUp/FAQ_premHA_s01.htm, Submitted on Nov. 24, 2003.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html, Submitted on Nov. 24, 2003.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable, Submitted on Nov. 24, 2003.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp, Submitted on Nov. 24, 2003.

"NetMeeting101," http://www.meetingbywire.com/NetMeeting101.htm, Submitted on Nov. 24, 2003.

"NetMeeting102," http://www.meetingbywire.com/NetMeeting102.htm, Submitted on Nov. 24, 2003.

"Instructions on Application Sharing and Data Collaboration," VCON Escort and Cruiser, http://www.vide.gatech.edu/docs/share/, Submitted on Nov. 24, 2003.

"Instructions on Multipoint Application Sharing and Data Collaboration," VCON Escort and Cruiser with the RadVision MCU, http://www.vide.gatech.edu/docs/multi-share/, Submitted on Nov. 24, 2003.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003, Submitted on Nov. 24, 2003.

Business Solutions/Professional, http://www.accessline.com/business_sol/bs_professional_body.html, Submitted on Nov. 24, 2003.

"Accessline Comms' Accessline Service, The One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html, Submitted on Nov. 24, 2003.

"TeleZapper from Privacy Technologies," Privacy Corps—Our Review, 2002, http://www.privacycorps.com/pages/product1.htm, Submitted on Nov. 24, 2003.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778, Submitted on Nov. 24, 2003.

Data Connection, Strategic Computer Technology, MeetingServer, "Broadband for Learning Case Study," Data Connection Ltd, 1998-2004, http://www.dataconnection.com/conferencing/meetingserver_casestudy.htm, Submitted on Nov. 24, 2003.

Data Connection, MailNGen, "Next Generation Messaging for Service Providers," Data Connection Limited, 2003-4, Submitted on Nov. 24, 2003.

Data Connection, Strategic Computer Technology, "Directories Explained," Data Connection Ltd, 1998-2004, http://www.dataconnection.com/inetapps/direxpl.htm, Submitted on Nov. 24, 2003.

Data Connection, Strategic Computer Technology, Directory Systems, "Directories and Meta-Directories," Data Connection Ltd, 1998-2004, http://www.dataconnection.com/inetapps/directory.htm, Submitted on Nov. 24, 2003.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm, Submitted on Nov. 24, 2003.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm, Submitted on Nov. 24, 2003.

Data Connection, Strategic Computer Technology, "Messaging Software Products and Services," Data Connection Ltd, 1998-2000, http://web.archive.org/web/20000819063320/www.dataconnection.com/messging/messgidx.htm, Submitted on Nov. 24, 2003.

Data Connection, Strategic Software Technology, "DC-Share for UNIX," Data Connection Ltd, 1998-2000, http://web.archive.org/web/20000914200713/www.dataconnection.com/conf/DCshare.htm, Submitted on Nov. 24, 2003.

Data Connection, Strategic Software Technology, "DC-H.323," Data Connection Ltd, 1998-2000, http://web.archive.org/web/20001120050600/www.dataconnection.com/conf/h323.htm, Submitted on Nov. 24, 2003.

Data Connection, Strategic Software Technology, "DC-WebShare," Data Connection Ltd, 1998-2000, http://web.archive.org/web/20001016115016/www.dataconnection.com/conf/webshare.htm, Submitted on Nov. 24, 2003.

Data Connection, Strategic Computer Technology, "DC-Recorder," Data Connection Ltd, 1998-2000, http://web.archive.org/web/20001016055611/www.dataconnection.com/conf/recorder.htm, Submitted on Nov. 24, 2003.

Data Connection, Strategic Software Technology, "DC-MeetingServer," Data Connection Ltd, 1998-2000, http://web.archive.org/web/20000914200719/www.dataconnection.com/conf/meetingserver.htm, Submitted on Nov. 24, 2003.

Data Connection, Strategic Computer Technology, "DC-MeetingServer," Data Connection Ltd, 1998-2000, http://web.archive.org/web/20021201144529/www.dataconnection.com/inetapps/conferencing.htm, Submitted on Nov. 24, 2003.

Data Connection, Strategic Software Technology, "DC-VoiceNet Features," Data Connection Ltd, 1998-2000, http://web.archive.org/web/20001016102614/www.dataconnection.com/messging/vnfeat.htm, Submitted on Nov. 24, 2003.

Data Connection, Strategic Software Technology, "DC-VoiceNet," Data Connection Ltd, 1998-2000, http://web.archive.org/web/20000914200424/www.dataconnection.com/messging/vnet.htm, Submitted on Nov. 24, 2003.

Data Connection, Strategic Computer Technology, "Messaging Software Products and Services," Data Connection Ltd, 1998-2000, http://web.archive.org/web/20010305143803/www.dataconnection.com/messging/messgidx.htm, Submitted on Nov. 24, 2003.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm, Submitted on Nov. 24, 2003.

Data Connection, "SmartDialer Functional Overview," Version v1.0, Internet Applications Group, Data Connection Ltd., Nov. 3, 2003, Submitted on Nov. 24, 2003.

Data Connection, "SIP Market Overview, An analysis of SIP technology and the state of the SIP Market," Jonathan Cumming, Data Connection Ltd., 2003-2004, Submitted on Nov. 24, 2003.

Data Connection, "Integrating Voicemail Systems, A white paper describing the integration of heterogeneous voicemail systems," Michael James, Internet Applications Group, Data Connection Ltd., 2004, Submitted on Nov. 24, 2003.

Data Connection, Strategic Computer Technology, "MailNGen: Next generation messaging for Service Providers," Data Connection Ltd, 1998-2004, http://www.dataconnection.com/messaging/, Submitted on Nov. 24, 2003.

Data Connection, Strategic Computer Technology, "MailNGen: Unified Messaging," Data Connection Ltd, 1998-2004, http://www.dataconnection.com/messaging/unified_messaging.htm, Submitted on Nov. 24, 2003.

Data Connection, Strategic Computer Technology, "MeetingServer: The award-winning web conferencing solution for Service Providers," Data Connection Ltd, 1998-2005, http://www.dataconnection.com/conferencing/, Submitted on Nov. 24, 2003.

Data Connection, Strategic Computer Technology, "MeetingServer: The web conferencing solution for Service Providers," Data Connection Ltd, 1998-2004, http://www.dataconnection.com/conferencing/meetingserver.htm, Submitted on Nov. 24, 2003.

Data Connection, Strategic Computer Technology, "MeetingServer: Web conferencing architecture," Data Connection Ltd, 1998-2004, http://www.dataconnection.com/conferencing/meetingserver_arch.htm, Submitted on Nov. 24, 2003.

U.S. Appl. No. 09/828,679, filed Apr. 6, 2001, Reding et al.

U.S. Appl. No. 09/785,223, filed Feb. 16, 2001, Swingle et al.

"MP3 Recorder Download—MP3 Recorder—Record Audio Stream to MP3 or WAV," 2002 http://www.mp3-recorder.net, Submitted on Nov. 24, 2003.

"Audio Digitizing Process," TalkBank, http://www.talkbank.oro/da/audiodig.html, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/bioloov/ProoressReports2002/Progress%20Reports2002/53SupplementalReport(10-20-02).htm.

"A Model for Presence and Instant Messaging", M. Day, et al. Fujitsu, Feb. 2000, Network Working Group, Request for Comments 2778.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

http://replay.waybackmachine.org/20020207142936/http://www.clicktocall.com/main.htm, Internet archive of website "www.clicktocall.com", dated Feb. 7, 2002.

Gaedke, et al., "Web Content Delivery to Heterogeneous Mobile Platforms", http://citeseer.ist.psu.edu/viewdoc/summary?doi=10 .1,1.33.4361, 1998, 1-14.

Gessler, et al., "PDAs as mobile WWW browsers", http://citeseer.ist.psu.edu/viewdoc/summary?doi=1 0.1.1.48.9198, 1995, 1-12.

Kunz, et al., "An Architecture for Adaptive Mobile Applications", http://citeseer.ist.psu,edu/viewdoc/summary?doi=1   0.1.1.40.624, 1999, 1-15.

Lauff, et al., "Multimedia Client Implementation on Personal Digital Assistants", http://citeseer.ist.psu.edu/viewdoc/summary?doi=1 0.1.1.6.6059, 1997, 1-15.

* cited by examiner

METHODS AND SYSTEMS FOR MULTIUSER SELECTIVE NOTIFICATION

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002, U.S. patent application Ser. No. 10/083,792, entitled "VOICE MAIL INTEGRATION WITH INSTANT MESSENGER," filed Feb. 27, 2002 now U.S. Pat. No. 7,142,646, U.S. patent application Ser. No. 10/083,884, entitled "DEVICE INDEPENDENT CALLER ID," filed Feb. 27, 2002 now U.S. Pat. No. 7,190,773, and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application Nos. 60/272,122 filed Feb. 27, 2001, 60/272,167 filed Feb. 27, 2001, 60/275,667, 60/275,719, 60/275,020, 60/275,031 all filed Mar. 13, 2001, and 60/276,505 filed Mar. 19, 2001, and all of which are expressly incorporated herein by reference in their entirety.

Applicants also claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR CONFIGURING AND PROVIDING CONFERENCE CALLS"; U.S. patent application Ser. No. 10/720,859, entitled "METHODS AND SYSTEMS FOR CONFERENCE CALL BUFFERING" (Now U.S. Pat. No. 7,418,090); U.S. patent application Ser. No. 10/720,009, entitled "METHODS AND SYSTEMS FOR COMPUTER ENHANCED CONFERENCE CALLING"; U.S. patent application Ser. No. 10/720,943, entitled "METHODS AND SYSTEMS FOR REMOTE CALL ESTABLISHMENT"; U.S. patent application Ser. No. 10/721,005, entitled "METHODS AND SYSTEMS FOR CALL MANAGEMENT WITH USER INTERVENTION"; U.S. patent application Ser. No. 10/720,868, entitled "METHODS AND SYSTEMS FOR DIRECTORY INFORMATION LOOKUP"; U.S. patent application Ser. No. 10/720,970, entitled "METHODS AND SYSTEMS FOR AUTOMATIC COMMUNICATION LINE MANAGEMENT BASED ON DEVICE LOCATION"; U.S. patent application Ser. No. 10/720,952, entitled "METHODS AND SYSTEMS FOR ADAPTIVE MESSAGE AND CALL NOTIFICATION"; U.S. patent application Ser. No. 10/720,870, entitled "METHODS AND SYSTEMS FOR A CALL LOG"; U.S. patent application Ser. No. 10/720,633, entitled "METHODS AND SYSTEMS FOR AUTOMATIC FORWARDING OF CALLS TO A PREFERRED DEVICE"; U.S. patent application Ser. No. 10/720,971, entitled "METHODS AND SYSTEMS FOR LINE MANAGEMENT"; U.S. patent application Ser. No. 10/720,784, entitled "METHODS AND SYSTEMS FOR CONTACT MANAGEMENT"; U.S. patent application Ser. No. 10/720,920, entitled "METHODS AND SYSTEMS FOR NOTIFICATION OF CALL TO PHONE DEVICE"; U.S. patent application Ser. No. 10/720,825, entitled "METHODS AND SYSTEMS FOR SINGLE NUMBER TEXT MESSAGING"; U.S. patent application Ser. No. 10/720,933, entitled "METHODS AND SYSTEMS FOR CPN TRIGGERED COLLABORATION"; and U.S. patent application Ser. No. 10/720,938, entitled "METHODS AND SYSTEMS FOR PREEMPTIVE REJECTION OF CALLS", all of which are expressly incorporated herein by reference in their entirety.

TECHNICAL FIELD

The present invention relates generally to data processing systems and, more particularly, to a method and system for managing one or more communications lines associated with a user of a communications network.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

SUMMARY

Methods and systems are provided for managing a communications line associated with a plurality of users of a communications network. These methods and systems include receiving first user line management information specifying handling of calls directed to the communications line from a contact in a first address book, the first address book associated with the first user, receiving second user line management information specifying handling of calls to the communications line from a contact in a second address book, the second address book associated with the second user, receiving from the communications network information regarding a call directed to the communications line, determining a handling procedure for the call based on the received first and second user line management information, and transmitting to the communications network instructions regarding the determined handling procedure, such that the communications network handles the call in accordance with the determined handling procedure.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts.

Figure 1:
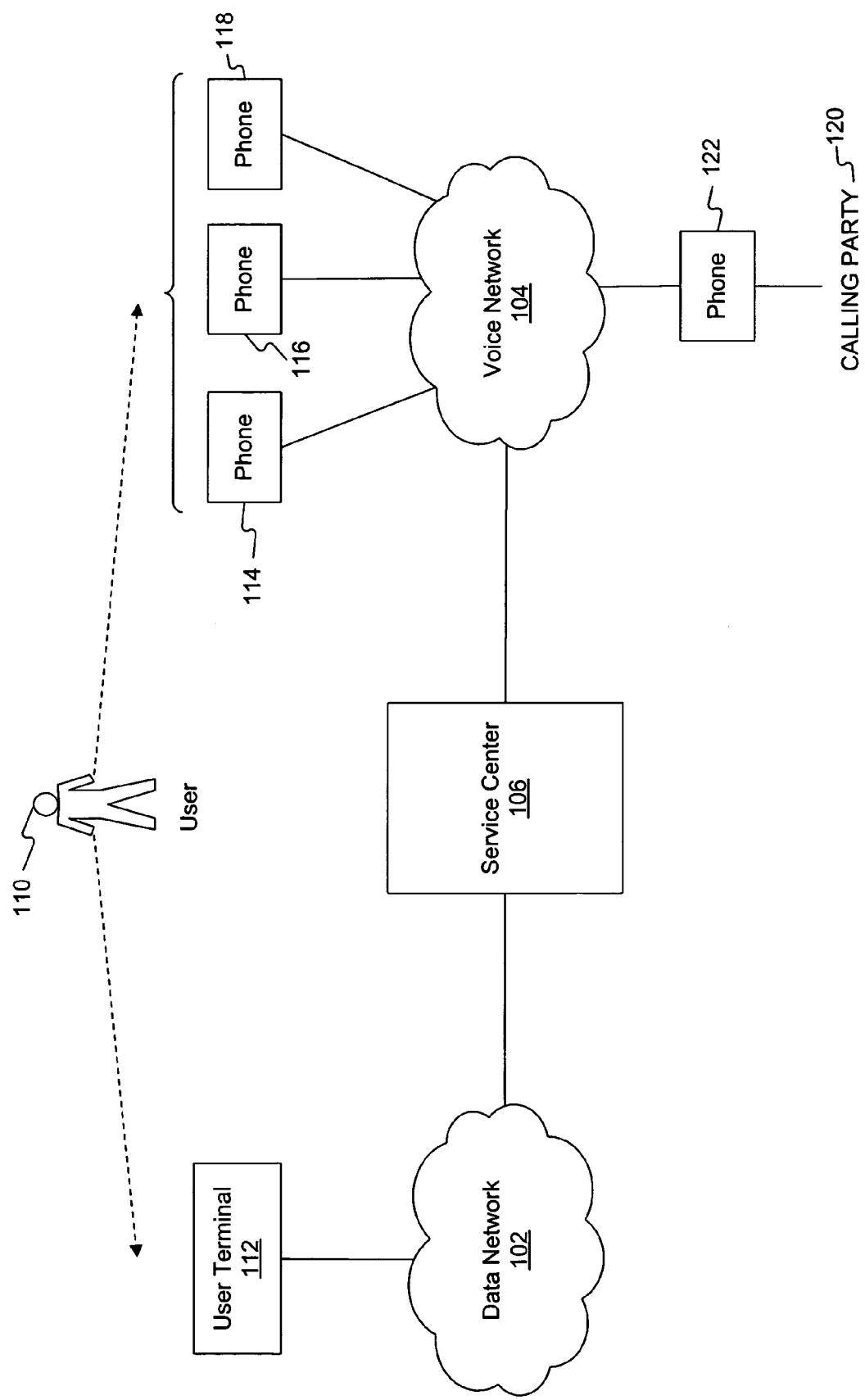
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use a phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, service center 106 may be connected to multiple data networks 102, such as, for example, to a wireless carrier network and to the Internet.

Voice network 104 may provide telephony services to allow a calling party, such as calling party 120, to place a call to user 110. In one embodiment, voice network 104 may be implemented using a network, such as the Public Switched Telephone Network ("PSTN"). Alternatively, voice network 104 may be implemented on a voice-over-broadband network, such as, for example, a network using voice-over-Internet Protocol ("VoIP") technology. Additionally, in other embodiments, voice network 104 may be a video-over-broadband network, such as, for example, a network for providing 2-way video communications. In another example, voice network 104 may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
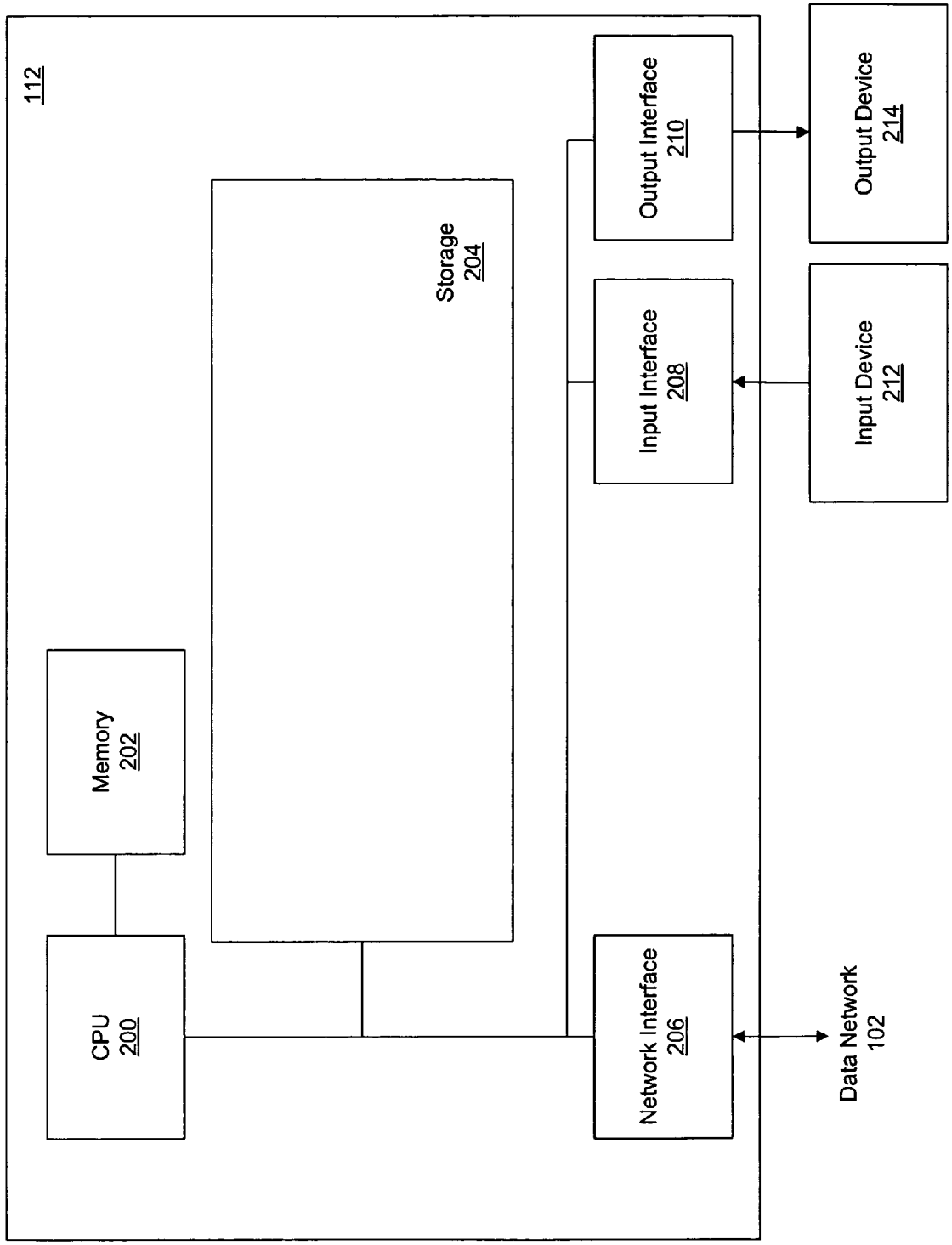
FIG. 2 is a diagram of an exemplary user terminal, consistent with the principals of the present invention.

FIG. 2 is a block diagram of a user terminal 112 consistent with the present invention. User terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for storing program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, a local area network ("LAN") port, a wireless modem, or a wireless data port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
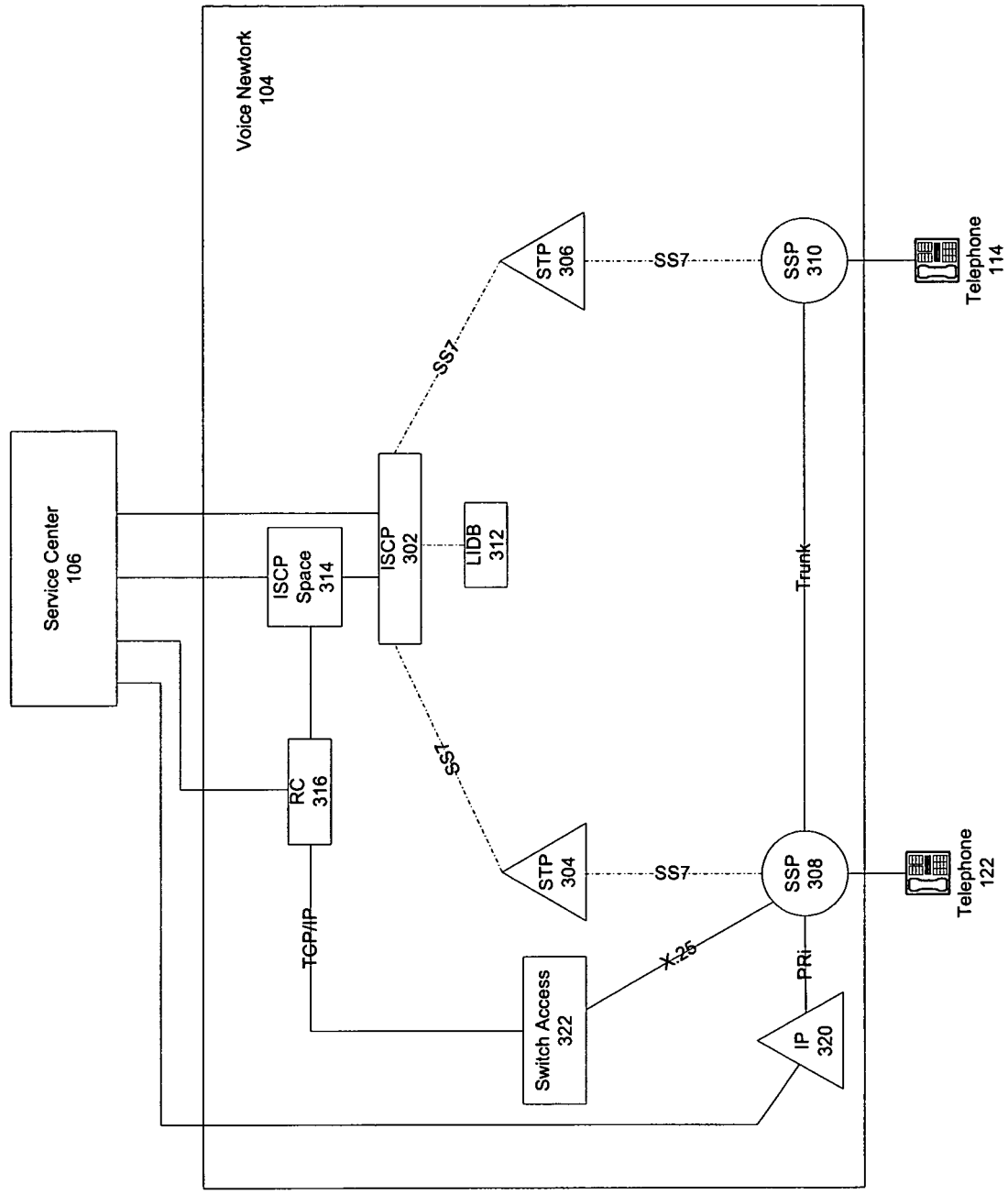
FIG. 3 is a diagram of a voice network, consistent with the principles of the present invention.

FIG. 3 is a diagram of a voice network 104, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320. Although voice network 104 in this embodiment is described as a PSTN, as discussed above in other embodiments, voice network 104 may be, for example, a voice- or video-over-broadband network, a wireless broadband network, a wireless voice network, etc.

Voice network 104 may be implemented using the PSTN and SS7 as a signaling protocol. As is known to those skilled in the art, the SS7 protocol allows voice network 104 to provide features such as call forwarding, caller-ID, three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP), an Advanced Intelligent Network (AIN) SCP, a soft switch, or any other network call controller. As used herein, the term service control point (SCP) is a generic term that covers standard SCPs, ISCPs and AIN SCPs. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with both a direct connection to service center 106 and a connection through ISCP SPACE 314, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GOI) for TCP/IP.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may comprise a subscriber database, including information, such as a service profile, name and address, and credit card validation information. Although LIDB 312, in this figure, is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of the ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in the ISCP SPACE 314 such that the records may be updated and sent to the ISCP 302. These records may comprise customer records including information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Recent change engine 316 may include one or more engines such as, for example, an Enterprise Recent Change engine (eRC); an Assignment, Activation, and Inventory System (MIS); or a multi-services platform (MSP). As an example, the eRC and MIS may be used in voice networks 104 located in the western part of the United States, while an MSP may be used in networks in the eastern part. Recent change engine 316 may be used to update switch and ISCP databases. For example, recent change engine 316 may deliver database updates to SSPs and to ISCPs, such that when updating databases, recent change engine 316 emulates human operators. Additionally, if the instructions are to be sent to an ISCP 302, recent change engine 316 may first send the instructions to the ISCP SPACE 314, which then propagates the instructions to the ISCP 302 as discussed above. Further, an MSP may be used, for example, for providing updates to both the SSPs 308 or 310 and the ISCPs 302. Alternatively, for example, an eRC may be used for providing updates to the SSPs 308 or 310, while an MIS is used for providing updates to the ISCPs 302. Additionally, updates sent to the SSPs 308 or 310 may be sent from recent change engine 316 via a switch access 320 that may, for example, convert the updates into the appropriate protocol for the SSP 308 or 310. For example, recent change engine 316 may send updates to the SSPs 308 or 310 via TCP/IP. The switch access 320 may then convert the updates from TCP/IP to X.25. This switch access 320 may be any type of hardware and/or software. Additionally, these connections may include any number of elements, such as, for example, switches, routers, hubs, etc. and may be, for example, an internal data network for the voice network 104.

As shown in FIG. 3, voice network 104 may include one or more intelligent peripherals (IPs) 320 connected to SSP 308. These IPs may be used for providing services, such as voice mail services. Additionally, the communications between the SSP 308 and IP 320 may use the Primary Rate interface (PRi) (e.g., the 1129 protocol) protocol. Additionally, IP 320 may be capable of sending and receiving information to/from the Service Center 106. These communications may use, for example, the SR-3511 protocol. Further, although FIG. 3 illustrates the connection between IP 320 and service center 106 as a direct connection, this connection may include any number of elements including routers, switches, hubs, etc., and may be via, for example, an internal data network for the voice network 104.

Figure 4:
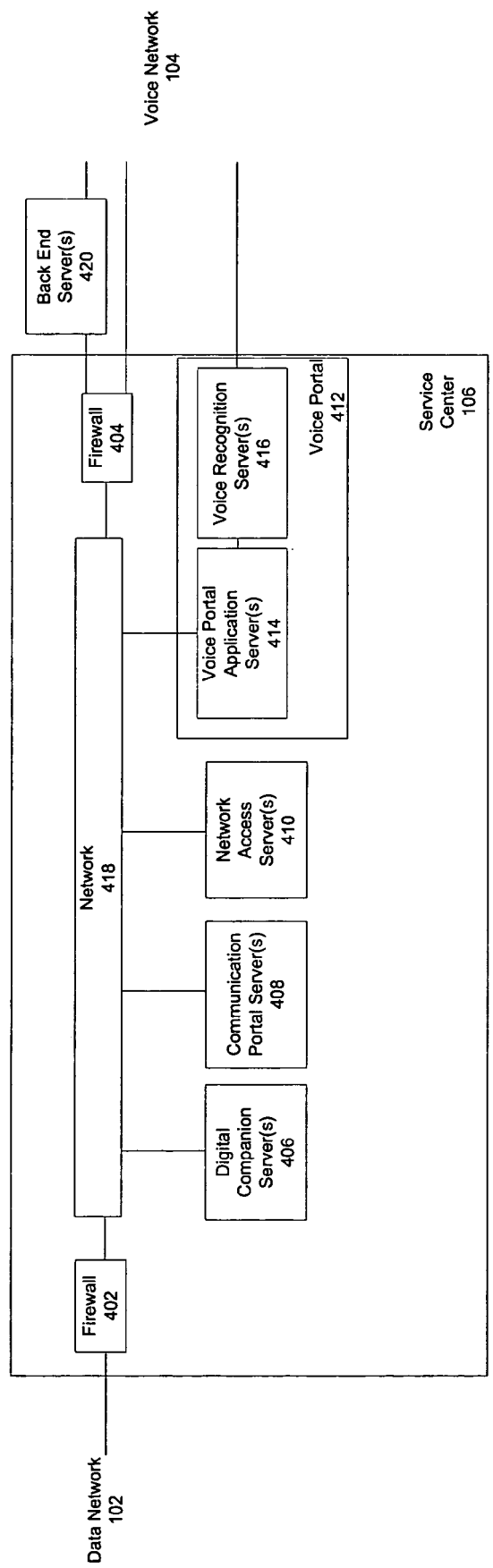
FIG. 4 is a block diagram of a service center, consistent with the principles of the present invention.

FIG. 4 is a block diagram of a service center 106, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix- or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc.

Communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer, using speech, may instruct the service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
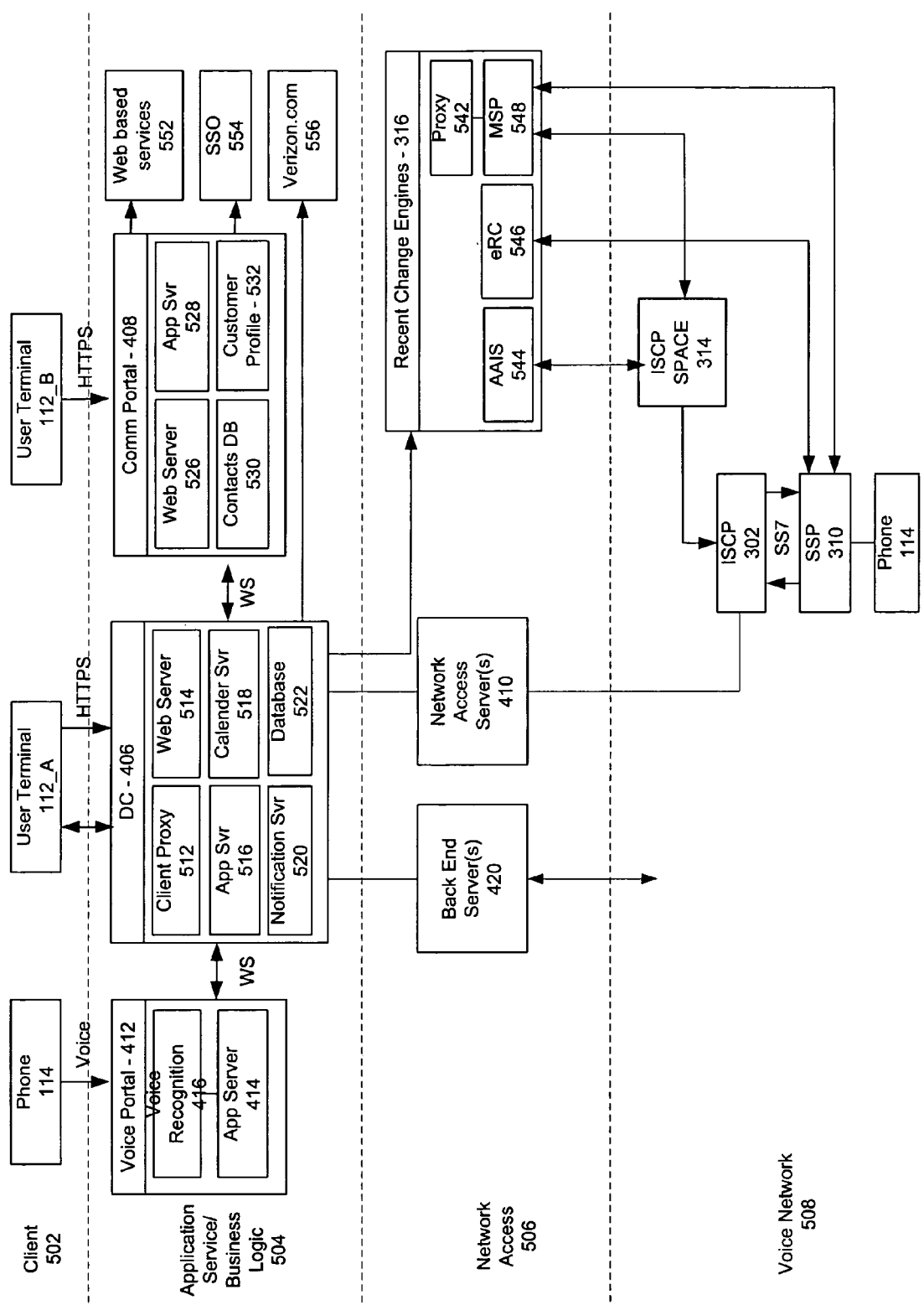
FIG. 5 illustrates a logical architecture of an exemplary system, consistent with the principles of the present invention.

FIG. 5 illustrates a logical architecture of an exemplary system, consistent with the present invention. As illustrated, the logical architecture may be split into four planes: client side 502, application service 504, network access 506, and voice network 508.

Client side 502 includes user terminals 112_A and 112_B that a user may use to send and/or receive information to/from service center 106. Additionally, client side 502 includes user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop type computer running a web browser for communicating with the Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to user terminal 112 via data network 102 go through client proxy 512. Also, if the client proxy 512 is included on a separate server, for example, an additional firewall may be provided between client proxy 512 and other digital companion servers to provide additional security.

Web server 514 provides functionality for receiving traffic over the data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc.

Additionally, application server function 516 may interface with one or more external devices, such as an external web server, for retrieving or sending information. For example, application server function 516 may interface with voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to user terminal 112. For example, notification server function 520 at the direction of application server function 516 may send a notification to user terminal 112 that the user is presently receiving a phone call directed to the user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any appropriate type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of the customer's voice network 104. As illustrated in FIG. 5, communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 406. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as the Internet. Application server function 528 may then provide connectivity over the Internet to external servers 552 that provide web services, such as the Superpages webpage. Application function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services plane 504 of the architecture may include voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network plane 508. For example, the network access plane 506 may include recent change engines 316, network access servers 410, and/or back end servers 420.

As discussed above, recent change engines 316 may be used to update switches and ISCP databases included in voice network 104 (FIGS. 1 and 3). In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in service center 106 (FIGS. 1 and 4) and may provide the hardware and software for sending and receiving information to voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of the voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Alternatively, back end server(s) 420 may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a SMS gateway in voice network 104. This may be used for example to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

The following provides a more detailed description of methods and systems for multi-user selective notification. For example, several people may use a particular phone (e.g., a husband, wife, child, etc.). In an exemplary embodiment, these different users may have separate accounts that are treated independently (secure from one another) for the phone, such that the users may independently modify their preferences, address books, etc. Additionally, each user may be able to select to have calls from individuals in their address book handled in a particular manner, such as, for example, forwarded to a particular number, sent to voicemail, and played an announcement. Additionally, these actions may also include playing a Supplemental Information Tone (SIT), such as described in U.S. application Ser. No. 10/720,938, entitled Methods and Systems for Preemptive Rejection of Calls, which is incorporated by reference herein in its entirety. A SIT tone is a particular sequence of tones that are used to provide information regarding a number (i.e., a communications line), such as that the number is unavailable, and is further described in ITU Recommendation E.180 entitled Various tones Used in National Networks.

The following provides a more detailed description of exemplary embodiments for providing two or more users of a particular communications line, such as phone 114, with the capability to individually manage calls to the communication line based upon individually provided line management information.

As discussed above, user terminal 112_A may execute a client application (hereinafter referred to as the Digital Companion ("DC") client application). This DC client application preferably can access digital companion server(s) 406 via, for example, the Internet. This DC client application preferably may retrieve information from the digital companion server(s) regarding the user's communication lines (e.g., their home phone, work phone, cell phone, etc.) that the user has elected to register for digital companion services. Further, as discussed above, the user may also access and retrieve such information from the digital companion server(s) 406 via a browser operating on a user terminal 112_B via communication portal 408. Or, as discussed above, the user may access and retrieve such information from the digital companion server(s) via voice portal 412 using a phone 114.

In an embodiment, an authorized user of a communication line (phone 114), such as, for example, the individual in whose name the communications line account is established, may contact their communication carrier (e.g., the company operating voice network 104 that provides the user with telephone services) and register to receive digital companion services. This may be done, for example, by calling their communication carrier, or accessing a computer, such as a web server via the Internet. Through such mechanisms, the user may establish a digital companion account for the communications line and receive authentication information for accessing digital companion services. This authentication information may include, for example, a user ID and a password.

Once an account is established, information may be provided from the voice network's data center 556 to the digital companion 406 such that a user profile, such as described above, is established for the user.

This first user may then access the digital companion servers 406 through their user terminal 112_A, provide their user ID and password, and modify their preferences, such as for example to create an address book for the user such as described in U.S. patent application Ser. No. 10/720,784, entitled Methods and Systems for Contact Management by Rajaqopalan et al., which is incorporated by reference herein in its entirety.

Additionally, the first user may be provided with an option for establishing multiple user accounts, each with their own user ID and password. These user accounts for this communications line (e.g., home phone 114) may then be independently administered. For example, the user's of these new accounts may then create their own independent address books, calendars, etc.

The individual user's may then, within their individual user accounts, individually manage handling of calls to the communication line. For example, each user may individually specify preferences, such as selecting names in their particular address book for specific treatment. Examples of specific treatments include forwarding a call to a specific number, forwarding the call to a voice mail system for the user, play a prerecorded message (e.g., a zap or a special message), providing a notification to the user's preferred device, providing a notification to a device other than the user's preferred device, etc. Once the user specifies those preferences, the user may cause the preferences to be sent to digital companion server(s) 416 and saved.

Application server 516 of digital companion server(s) 416 may then access each user's contact list, calendar, etc. to create a disposition list for the communications line (e.g., phone 114). This disposition list identifies how calls from different numbers are to be handled (e.g., where to forward the calls). The disposition list may be stored as a complete list for the home phone number, or as individual lists for each user.

The following provides a more detailed description of an exemplary embodiment for enabling users to individually manage the communication line. As discussed above, each user may have an address book that includes the names, phone numbers, and/or addresses of people and/or organizations. This address book may be stored in contacts database 530. A user wishing to add, delete or modify contacts in their address book may bring up the DC client application, which may include an option for modifying the address book.

The DC client application may then contact digital companion servers 406 to retrieve the user's address book. If user terminal 112_A is connected to the Internet, this may be accomplished, for example, by the a DC client application on user terminal 112_A retrieving the address book from digital companion server(s) 406. In another example, the user may access and modify their address book by directly contacting communication portal 408 via a user terminal (e.g., user terminal 112_B) executing an appropriate client application such as, for example, a web browser application.

Once the user terminal (e.g., 112_A or 112_B) has retrieved the user's address book, the user may then add, delete, or modify their contacts. Additionally, the address book may also include an entry for each contact regarding how calls from this particular contact are to be handled. As discussed above, a user may wish that all calls from a particular contact be forwarded to the user's cell phone. The user may then select on a particular entry in their address book to bring up details regarding this contact.

Figure 6:
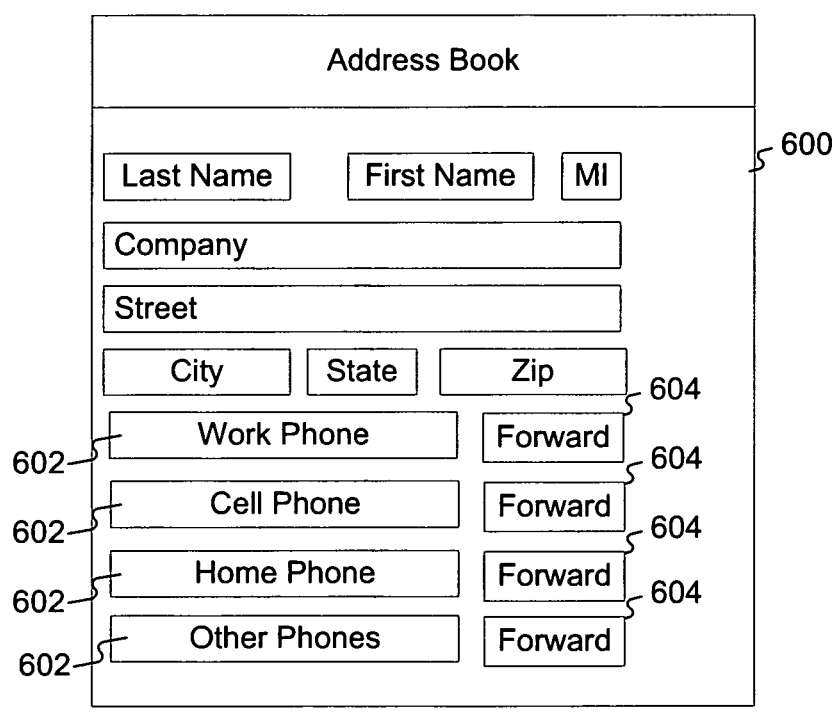
FIG. 6 illustrates an exemplary screen shot of a screen that may be displayed to a user for a particular contact in their address book, consistent with the principles of the present invention.

FIG. 6 illustrates a display screen 600 with which a user may be presented for a particular contact in their address book. As illustrated, screen 600 may include various phone numbers 602 for the contact (e.g., a work number, cell phone number, home numbers, etc.). Additionally, screen 600 may include selection buttons 604 for forwarding calls from this contact's different numbers. A user may then click on a button 604 to bring up subsequent screens for specifying how calls from this particular number are to be treated. Further, screen 600 may also include additional buttons (not shown) for selecting alternative handling of calls from this contact, such as, for example, blocking calls and forwarding them automatically to voice mail, playing a specially recorded message to the user, forwarding notification of the call to a particular device, etc. Or, rather than individual buttons for each different type of possible handling, the screen may include simply a single button (not shown) for selecting special handling for this number. Then, subsequent screens may be provided to the user so that the user may select the type of specialized handling. For example, if the user selects to play an announcement, the user may then be presented with options for either selecting a prerecorded message or for recording an announcement. For a further description of an example where a user can request specialized handling of calls from contacts in a user's address book see U.S. patent application Ser. No. 10/720,971, entitled Methods and Systems for Line Management, which is incorporated by reference herein in its entirety.

Also, screen 600 may include a single button (not shown) for selecting a treatment for all numbers associated with the contact. Thus, rather than selecting individual treatments for each of the contacts numbers, the user may select such a button so that all calls from this contact are handled in a common manner.

The user may also schedule handling of calls from a particular contact. For example, the user may select to have calls to their home phone 114 from a particular contact forwarded to their office phone during working hours (e.g., 9 a.m.-5 p.m., Monday thru Friday), to their cell phone during rush hour (e.g., 8 a.m. to 9 a.m. and 5 p.m. to 6 p.m., Monday thru Friday), to voice mail during sleeping hours (e.g., 10 p.m. to 6 a.m., everyday), and to their home phone 114 at any other time. For a further description of scheduling call handling see the above-referenced U.S. patent application Ser. No. 10/720, 971, entitled Methods and Systems for Line Management.

In another embodiment, rather than forwarding calls to a phone, a user may elect to have calls forwarded to an application, such as for example, an instant messenger application on a wireless personal data assistant (PDA), so that an instant message regarding the call, including, for example, caller-ID information regarding the call, is sent to the user's PDA. Additionally, digital companion server(s) 406 may use the caller-ID of the caller determine if the caller also is registered with the digital companion server(s). If so, the digital companion server(s) 406 may determine if the caller has registered an instant messaging application. Then, if the caller also has an instant messaging application, digital companion server(s) 406 may establish a communication session between the instant messaging applications and direct, for example, that can audible message be played to a caller that the call has been forwarded to an instant messaging application. Then, the caller and the user may send each other instant messages.

After making selections, the user can elect to save changes, such that the changes are stored by digital companion server(s) 406 and/or communication portal 408. For example, once the user elects to save changes, the DC client application on user terminal 112_A may send these changes to the digital companion server(s) via web server 514. Application server 516 may then save these changes in the appropriate databases.

Figure 7:
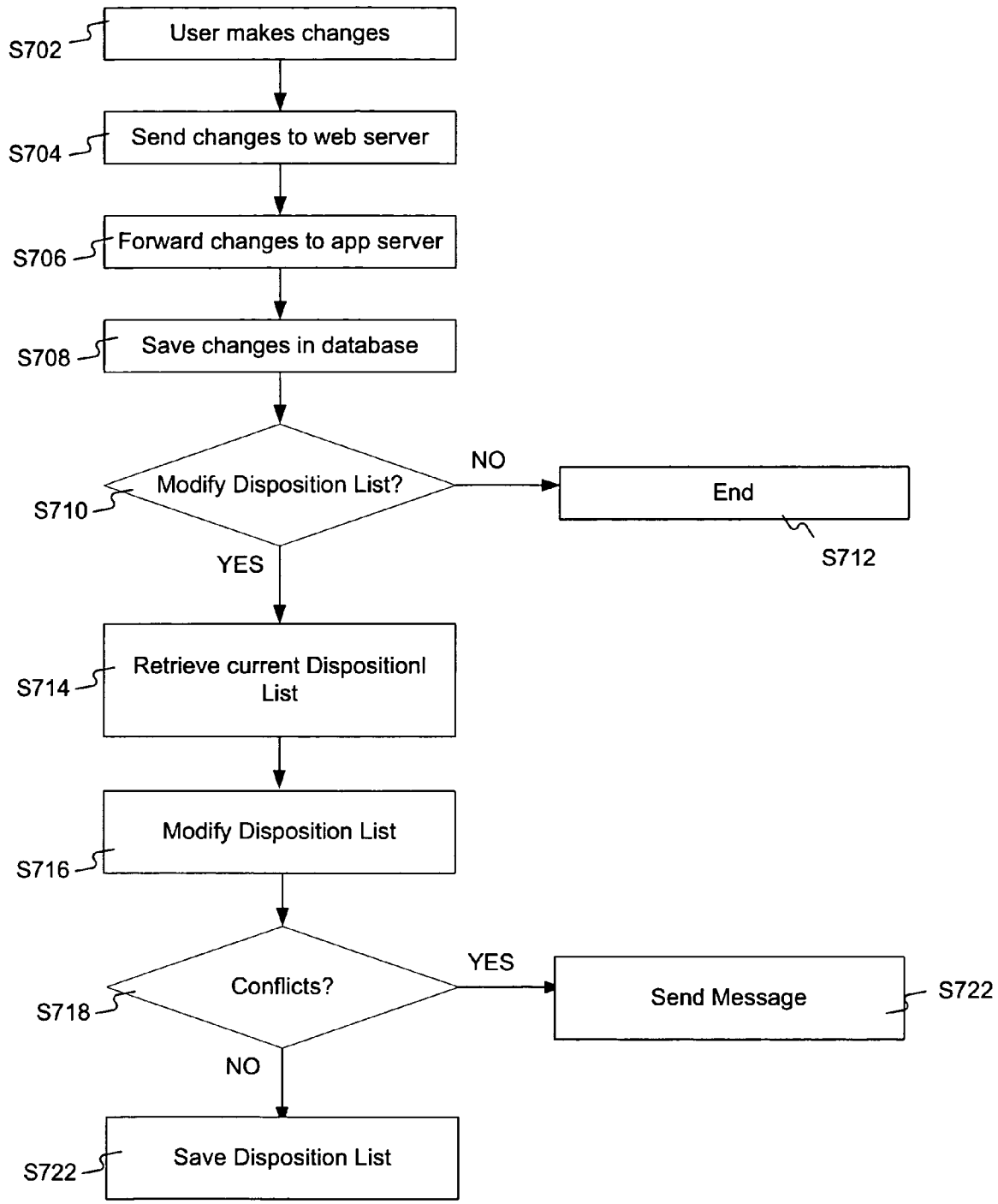
FIG. 7 illustrates a flow for chart for an exemplary method for modifying a disposition list in response to user modifications, consistent with the principles of the present invention.

FIG. 7 illustrates a flow for chart for an exemplary method for modifying a disposition list in response to user modifications, in accordance with methods and systems consistent with the invention. As discussed above, a user may make changes using their address book to specify how calls from different contacts in their address book will be handled. (S702). The user may then save their changes, such that the changes are forwarded to digital companion server(s) 406.

In one example, user terminal 112_A executes a DC client application that may send the changes via the Internet to web server 514 of digital companion server(s) 406. (S704). Web server 514 may then forward the changes to application server 516. (S706). Application server 514 may then save the changes in database 522. (S708).

Application server 516 may then determine whether the treatments for any calls changed and whether or not to create or modify a disposition list for the communications line (e.g., the user's home phone 114). (S710). If not, the application server 516 does not modify the disposition list. (S712).

If creating or modification is required, application server 516 retrieves the current disposition list for the communications line from the databases 522. (S714) Application server 516 then accesses the address books, calendars, etc. for all users associated with the communication line and makes the appropriate changes in the disposition list. (S716). Application server 516 then determines if there are any conflicts. (S718).

For example, a first user may select to have calls from a particular contact handled in a particular manner, and then later a second user may select to have calls from this same contact handled in different manner. If a conflict exists, the application server 516, in this example, does not make the change in the disposition list and instead sends a message to the user terminal 112_A informing the user of the conflict. (S720). Additionally, the user may be provided with information regarding the user with which the conflict exists. These users may then determine amongst themselves how to handle the conflict. In another example, the different users may be assigned priorities, such that a user (e.g., the user whose name in which the communications line is registered) may be allowed to override the other users. If there is no conflict or once the conflict is resolved, the application server 516 saves the disposition list in the databases 522. (S722).

Figure 8:
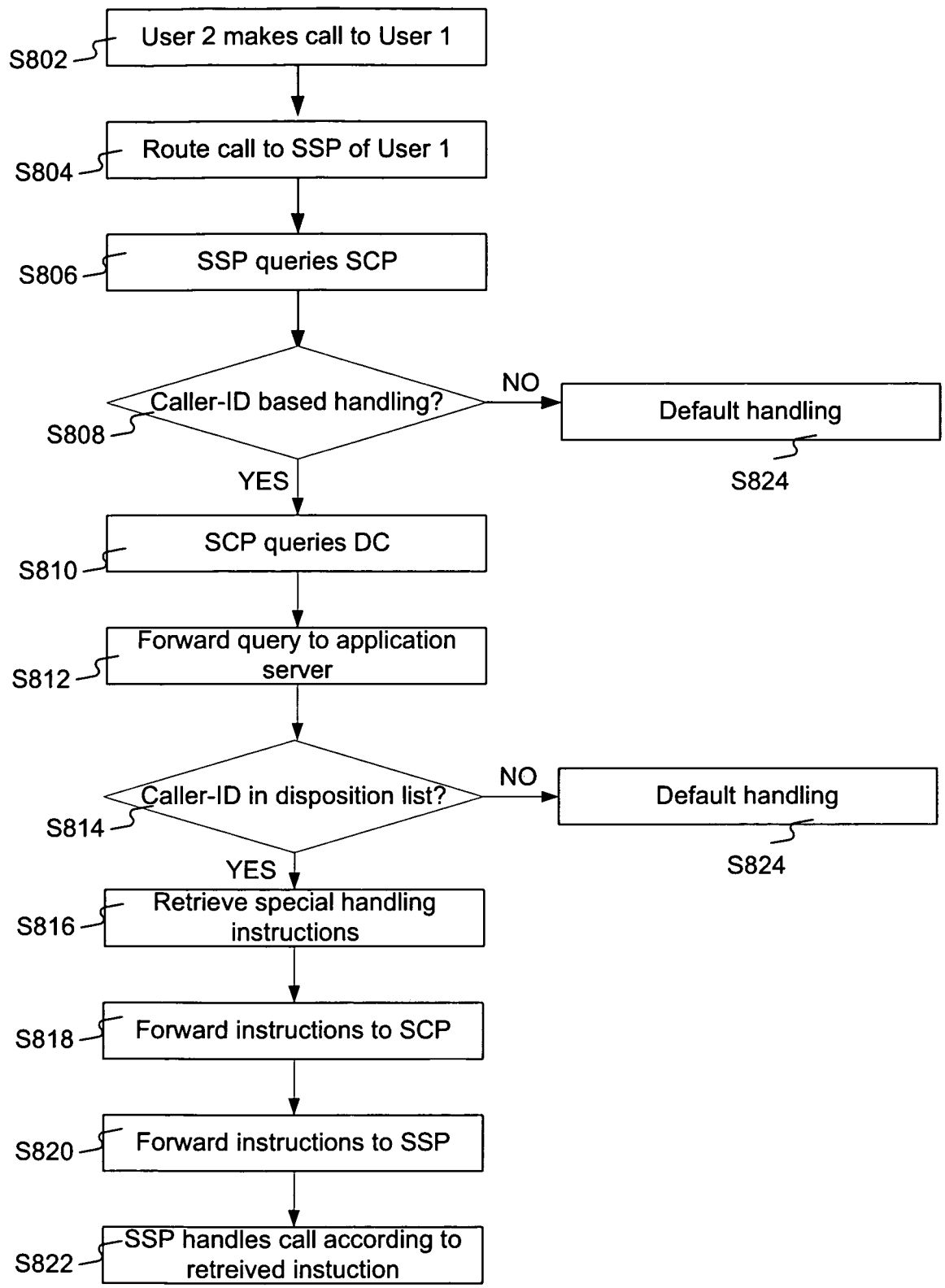
FIG. 8 illustrates a flow chart of a method for handling calls based on the identity of the caller, consistent with the principles of the present invention.

FIG. 8 illustrates a flow chart of a method for handling calls based on the identity of the caller in accordance with methods and systems consistent with the invention. First, a call directed to the user's communications line (e.g., to phone 114) is received. (S802). The call is then routed by network 104 to SSP 310, which is associated with user phone 114. (S804). SSP 310 then generates a trigger that is picked up by ISCP 302 (S806). This trigger may be, for example, a Termination Attempt Trigger (TAT) or a Specific Digit String (SDS). ISCP 302 then determines if special handling based on caller-ID should be applied. (S808). If so, ISCP 302 queries digital companion server(s) 406 through network access server 410 (S810). This query may include the calling party's phone number (i.e., "caller-ID").

The query is then forwarded to application server 516 of digital companion server(s) 406. (S812). Application server 516 then looks up the caller-ID in the disposition list (S814). If the number is found in the disposition list, application server 516 retrieves from the disposition list the handling for the call (S816). Application server 516 then instructs ISCP 302 to handle the call according to the retrieved handling instructions (S818). In response, ISCP 302 instructs SSP 310 how to handle the call (S820). SSP 310 then handles the call according to the received instructions. (S822).

In a first example, the call is from calling party for which the disposition list specifies that calls are to be forwarded to a particular number ("forward-to number"), such as for example, to a mobile phone. In such an example, application server 516 may send an instruction to forward the call to ISCP 302 via network access server 410 (S818). ISCP 302 may then instruct SSP 310 to forward the call to the forward-to number, i.e. to the mobile phone (S820). In response, SSP 310 forwards the call to the forward-to number (S822). Further, as discussed above, the user may elect to only forward the call if the called number is not answered within a user specified number of rings.

In a second example, the caller-ID may not exist in the disposition list (Step 814) or the user may have not specified any handling based on call origination (Step 808) and application server 516 may elect to apply a user specified default treatment to the call (S824). For example, the user may elect for home phone 114 to ring if no specific treatment is specified. In other examples, the default may be set to forward the call to a particular number such as mobile phone or a vacation number, if, for example, the user is on vacation. In such an example, the default handling may be stored in digital companion server(s) 406 and then retrieved and forwarded by application server 516 to ISCP 302 as discussed above. Or, in another example, application server 516 may simply send an instruction to ISCP 302 to handle the call according to its default (e.g., the information stored in ISCP 302 or SSP 306 regarding handling of calls to this communications line). In order to prevent conflicts, in an embodiment only the primary user (i.e., the user in whose name the communications line account is listed) may be permitted to specify default treatments for all calls to the communication line. For a further description of specifying default call treatments see U.S. patent application Ser. No. 10/720,971, entitled Methods and Systems for Line Management by Reding et al., which is hereby incorporated by reference in its entirety.

In a third example, a user may select that calls from a particular contact be sent directly to voice mail. In such an example, application server 516 may send an instruction to ISCP 302 to forward the call to voice mail (S818). ISP 302 then may send an instruction to the SSP 310 (S820). In response, SSP 310 forwards the call to an IP 320 providing voice mail services (S822).

In a fourth example, the user may select that a SIT tone be played to the caller based on the caller-ID or in the event the caller-ID is unavailable. In such an example, application server 516 may send an instruction to play a SIT tone to ISCP 302. (S818). In response, ISCP 310 may direct SSP 310 to forward the call to an IP 322 (FIG. 3), which in turn plays a SIT tone. (S820). The call may then be terminated or forwarded to voice mail, etc. (S822). Alternatively, rather than playing a SIT tone, the user may direct that a particular voice recording be played to the caller based on the caller-ID.

In a fifth example, the user may specify an instruction to receive notification on a particular user device for calls from a particular contact(s) in the user's address book. In such an example, application server 516 may retrieve this instruction from the disposition list. Application server 516 may then determine whether the user is currently logged on via a user device (e.g., user terminal 112_A). If so, application server 516 may send a notification using notification server 520 to the user's device, e.g., user terminal 112_A. This notification may provide the user with various options, such as, for example, forwarding the call to a preset number or to a number entered in real time. In response to the notification, the user may elect, for example, to forward the call to a particular number (e.g., the user's cell phone) that may be preset or entered in real time. This selection is then forwarded to application server 516 of digital companion server(s) 406 through, for example, web server 514. Application server 516 may then send an instruction to switch 310 to forward the call. For a further description of methods and systems for real-time call management see U.S. patent application Ser. No. 10/721,005, entitled Methods and Systems for Call Management with User Intervention by Chingon et al., which is hereby incorporated by reference in its entirety.

In yet another example, the user may specify both a primary and a secondary handling procedure for calls, such that the secondary handling procedure is implemented if for example the primary handling procedure cannot be completed or some other criteria is met, such as, for example, user specified criteria. For example, the user may desire to have calls to their home phone from a particular contact ring the home phone, but if the home phone is busy or not answered within a specific number of rings then forward the call to the user's cell phone. The user may also be able to schedule these primary and secondary handling procedures.

The user may specify these primary and secondary handling procedures in a similar manner to the scheduling of a single handling procedure using screens such as those described above, wherein these screens provide the user with the ability to specify both primary and secondary handling procedures. Additionally, these screens may permit the user to specify when the secondary handling procedure should be used. For example, the user may specify that the secondary handling procedure be used if the primary handling procedure cannot be completed because the line is busy or not answered in a predetermined number of rings, or, if the phone is turned off or out of range as may, for example, be the case with wireless phones.

In the example of a user specifying both a primary and secondary handling procedure, when a call arrives at the communications line, the application server 514 may determine based on the user specified criteria, whether to apply the primary or secondary handling procedures. The application server 514 may then direct that the call be handled based on the determined procedure using methods and systems, such as those discussed above.

In another example, in addition to the user specifying that the handling procedure be based on a schedule, the user may also be capable of specifying the handling procedure based on the user's location. For example, the user may be able to specify for calls to be forwarded to their office phone if, for example, the user is logged on to the digital companion server(s) via a computer in the user's office. Or, for example, the user may specify that the calls be forwarded to the user's wireless phone if for example, the user is logged on to the digital companion server(s) via a wireless device, such as, for example, their wireless phone or a PDA. Additionally, in another example, the user may have a device with Global Positioning System (GPS) type capabilities such that the user's location is forwarded to the digital companion server(s) 416. The user in such an example may then specify how to handle calls from contact(s) based upon the information regarding the user's location.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for managing a communications line associated with a plurality of users of a communications network, comprising:

receiving first user line management information, for a first user of the communications line, specifying first preferences of the first user for communicating with contacts of the first user included in a first address book, wherein the first preferences identify the contacts of the first user and corresponding procedures for handling calls between the first user and the contacts of the first user;

receiving second user line management information, for a second user of the communications line, specifying second preferences of the second user for communicating with contacts of the second user included in a second address book distinct from the first address book, wherein the second preferences identify the contacts of the second user and corresponding procedures for handling calls between the second user and the contacts of the second user;

receiving, from the communications network, information regarding a call directed to the communications line;

determining a handling procedure for the call based on the received first and second user line management information; and transmitting, to the communications network, instructions regarding the determined handling procedure, such that the communications network handles the call in accordance with the determined handling procedure.

2. The method of claim 1, wherein receiving from the communications network information regarding a call received on the communications line includes receiving information from a service control point providing services to a switch associated with the communications line.

3. The method of claim 1, wherein receiving from the communications network information regarding a call includes receiving information identifying an origination of the call; and wherein determining a handling procedure includes determining a handling procedure based on the information identifying the origination of the call.

4. The method of claim 1, wherein receiving line management information includes receiving information regarding forwarding calls to a different communications line.

5. The method of claim 1, wherein receiving line management information includes receiving information regarding handling calls based on the time the call is received.

6. The method of claim 1, wherein receiving line management information includes receiving information regarding forwarding calls to one or more processors providing voice mail services.

7. The method of claim 1, wherein receiving line management information includes receiving information regarding forwarding calls to at least one processor for playing an audible signal indicating unavailability of the communications line.

8. The method of claim 1, wherein receiving first user line management information includes receiving a request to forward a notification regarding a call to a first device associated with the first user.

9. The method of claim 8, further comprising:

receiving, in response to the notification, an instruction regarding handling of the call; and wherein the determined handling procedure is based on the received instruction.

10. The method of claim 1, wherein receiving line management information includes receiving information regarding a first handling procedure, information regarding a secondary handling procedure, and information useful for determining whether to apply the primary or secondary handling procedure; and wherein determining a handling procedure of the call includes determining whether to handle the call using the primary or secondary handling procedure.

11. The method of claim 1, wherein receiving line management information includes receiving information regarding handling of calls based upon information regarding a location of the first or second user.

12. A system for managing a communications line associated with a plurality of users, comprising:

a first interface for connecting to a data network;

a second interface for connecting to a communications network including at least one processor configured to perform operations comprising:

receiving first user line management information, for a first user of the communications line, specifying first preferences of the first user for communicating with contacts of the first user included in a first address book, wherein the first preferences identify the contacts of the first user and corresponding procedures for handling calls between the first user and the contacts of the first user;

receiving second user line management information, for a second user of the communications line, specifying second preferences of the second user for communicating with contacts of the second user included in a second address book distinct from the first address book, wherein the second preferences identify the contacts of the second user and corresponding procedures for handling calls between the second user and the contacts of the second user;

receiving, from the communications network, information regarding a call directed to the communications line;

determining a handling procedure for the call based on the received first and second user line management information; and transmitting, to the communications network, instructions regarding the determined handling procedure for the call, such that the communications network handles the call in accordance with the determined handling procedure.

13. The system of claim 12, wherein the at least one processor is further configured to receive information from a service control point providing services to a switch associated with the communications line.

14. The system of claim 12, wherein the at least one processor is further configured to receive from the communications network information identifying an origination of the call, and determining the handling procedure based on the information identifying the origination of the call.

15. The system of claim 12, wherein the at least one processor is further configured to receive line management information including information regarding forwarding calls to a different communications line.

16. The system of claim 12, wherein the at least one processor is further configured to receive line management information including information regarding handling calls based on when the call is received.

17. The system of claim 12, wherein the at least one processor is further configured to receive line management information including information regarding forwarding calls to one or more processors providing voice mail services.

18. The system of claim 12, wherein the at least one processor is further configured to receive line management information including information regarding forwarding calls to one or more processors for playing an audible signal indicating unavailability of the communications line.

19. The system of claim 12, wherein the at least one processor is further configured to receive first user line management information including a request to forward a notification regarding a call to a first device associated with the first user.

20. The system of claim 19, wherein the at least one processor is further configured to receive, in response to the notification, an instruction regarding handling of the call, and determining the handling procedure based on the received instruction.

21. The system of claim 12, wherein
the at least one processor is further configured to receive line management information including information regarding a first handling procedure, information regarding a secondary handling procedure, and information useful for determining whether to apply the primary or secondary handling procedure, and
in determining a handling procedure of the call, the at least one processor is further configured to determine whether to handle the call using the primary or secondary handling procedure.

22. The system of claim 12, wherein the at least one processor is further configured to receive information regarding a location of the first or second user and receiving line management information including information regarding handling of calls based upon the information regarding a location of the first or second user.

23. A system for managing a communications line associated with a plurality of users of a communications network, comprising:
means for receiving first user line management information, for a first user of the communications line, specifying first preferences of the first user for communicating with contacts of the first user included, in a first address book, wherein the first preferences identify the contacts of the first user and corresponding procedures for handling calls between the first user and the contacts of the first user;
means for receiving second user line management information, for a second user of the communications line, specifying second preferences of the second user for communicating with contacts of the second user included in a second address book distinct from the first address book, wherein the second preferences identify the contacts of the second user and corresponding procedures for handling calls between the second user and the contacts of the second user;
means for receiving, from the communications network, information regarding a call directed to the communications line;
means for determining a handling procedure of the call based on the received first and second user line management information; and
means for transmitting, to the communications network, instructions regarding the handling procedure, such that the communications network handles the call in accordance with the determined handling procedure.

24. The system of claim 23, wherein the means for receiving from the communications network information regarding a call includes means for receiving information from a service control point providing services to a switch associated with the communications line.

25. The system of claim 23, wherein:
the means for receiving from the communications network information regarding a call includes means for receiving information identifying an origination of the call; and
the means for determining handling of the call includes means for determining the handling based on the information identifying the origination of the call.

26. The system of claim 23, wherein the received line management information includes information regarding forwarding calls to a different communications line.

27. The system of claim 23, wherein the received line management information includes information regarding handling calls based on when the call is received.

28. The system of claim 23, wherein the received line management information includes information regarding forwarding calls to one or more processors providing voice mail services.

29. The system of claim 23, wherein the received line management information includes information regarding forwarding calls to one or more processors for playing an audible signal indicative of the communications line being unavailable.

30. The system of claim 23, wherein the first user received line management information includes a request to forward a notification regarding a call to a first device associated with the first user.

31. The system of claim 30, further comprising means for receiving, in response to the notification, an instruction regarding handling of the call; and
wherein the determined handling is based on the received instruction.

32. The system of claim 23, wherein the first user received line management information includes information regarding a first handling procedure, information regarding a secondary handling procedure, and information useful for determining whether to apply the primary or secondary handling procedure; and
wherein the determined handling is based on the primary or secondary handling procedure.

33. The system of claim 23, wherein the first user received line management information includes information regarding handling of calls based upon information regarding a location of the first or second user.

34. A system for managing a communications line associated with a plurality of users of a communications network, comprising:
a switch for receiving calls directed to the communications line and generating a trigger in response to receiving a call directed to the communications line;
a service control point for receiving the trigger and transmitting information regarding an origination of the call;
a storage device storing:
a first disposition list specifying first preferences of a first user for communicating with contacts of the first user included in a first address book, wherein the first preferences identify the contacts of the first user and corresponding procedures for handling calls between the first user and the contacts of the first user; and
a second disposition list specifying second preferences of a second user for communicating with contacts of the second user included in a second address book distinct from the first address book, wherein the second preferences identify the contacts of the second user and corresponding procedures for handling calls between the second user and the contacts of the second user;

a set of processors connected to a data network and the communications network, the set of processors configured to perform operations comprising:
  receiving, from the service control point, the information regarding the origination of the call;
  determining, based on the first disposition list or the second disposition list and the information regarding the origination of the call, a handling procedure for the call; and
  transmitting an instruction to the service control point to handle the call in accordance with the determined handling procedure; and
a user device connected to the data network, the user device being configured to transmit information to the set of processors regarding handling of calls directed to the communications line originating from a contact in the first address book or in the second address book, such that the information regarding handling of the call from the contact is stored in the first disposition list or in the second disposition list.

35. The method according to claim 1, wherein the first user establishes the first preferences by selecting one or more of contacts of the first user in the first address book by name, and specifying the procedures for the selected contacts in advance of receiving the call directed to the communications line.

* * * * *